Figure 1:
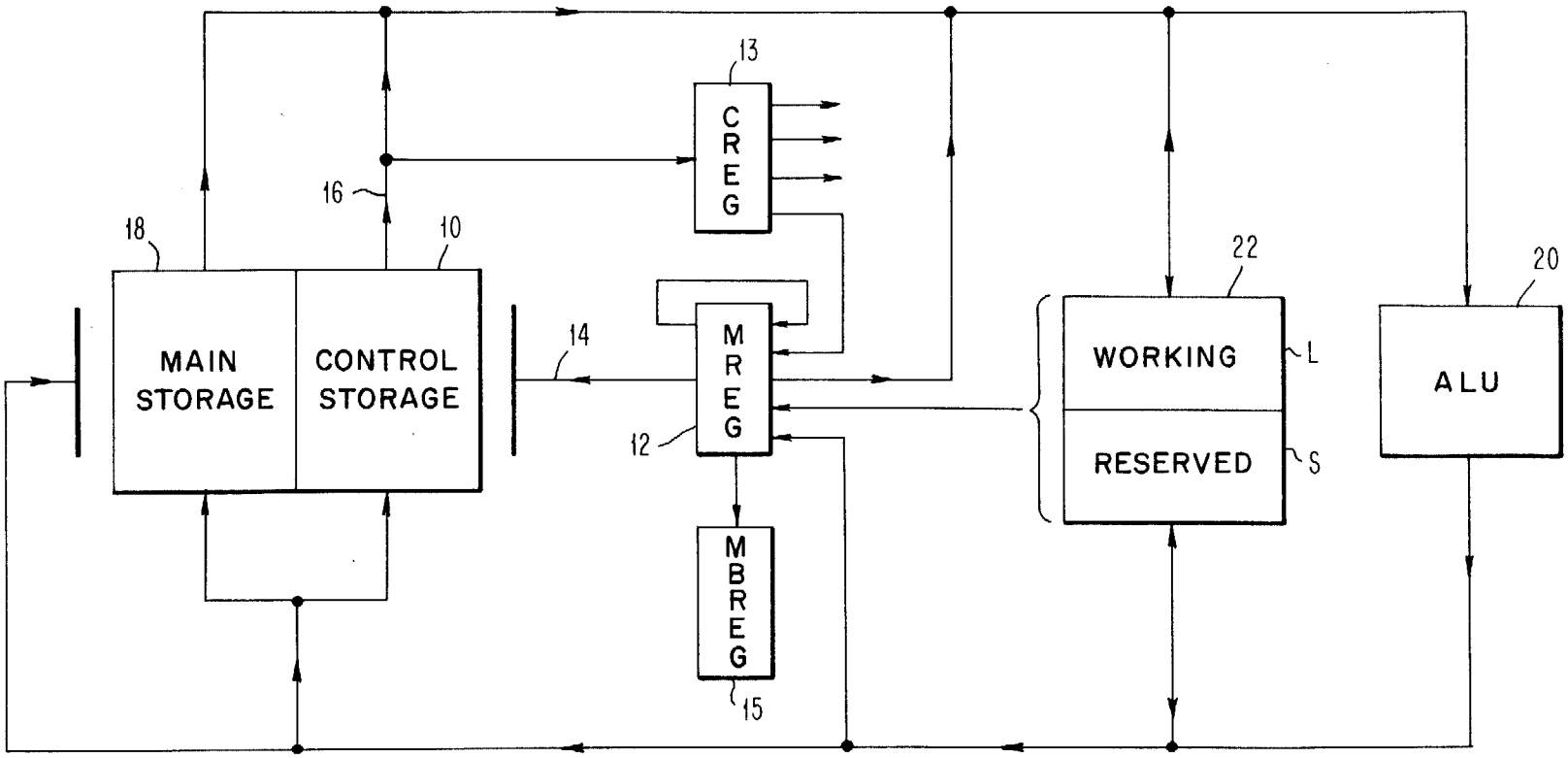
Figure 2A:
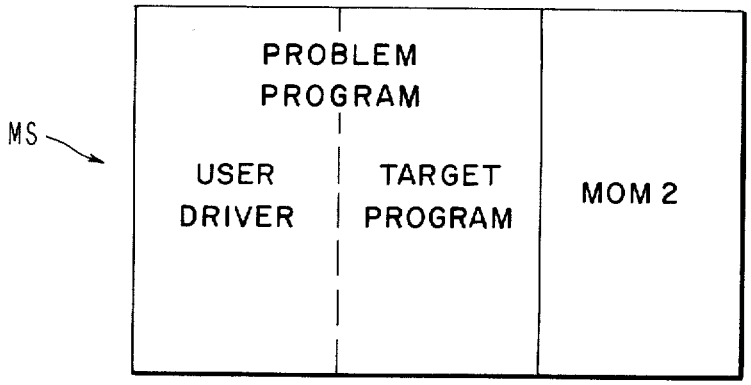
Figure 2B:
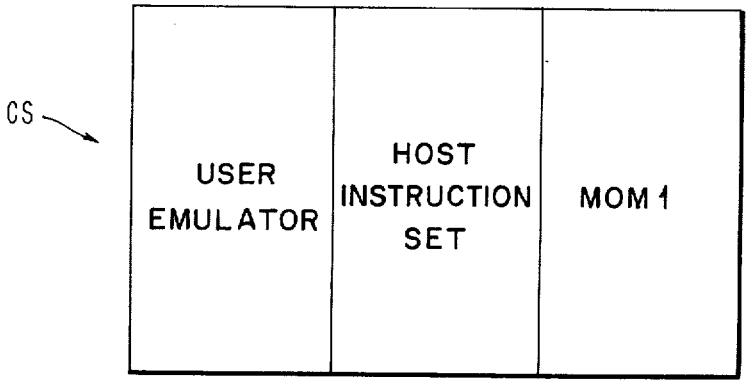
Figure 3:
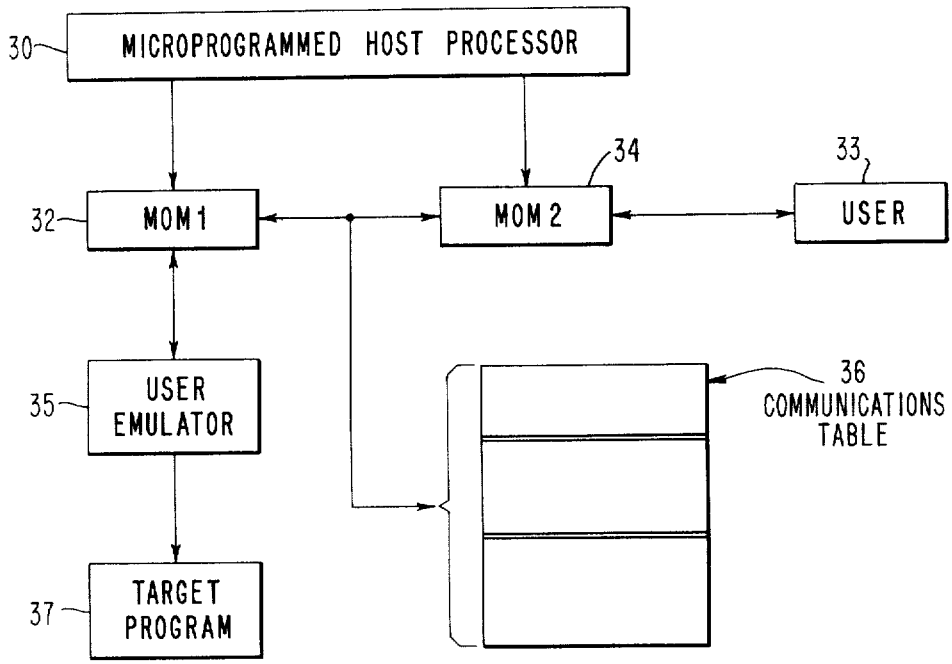
Figure 4:
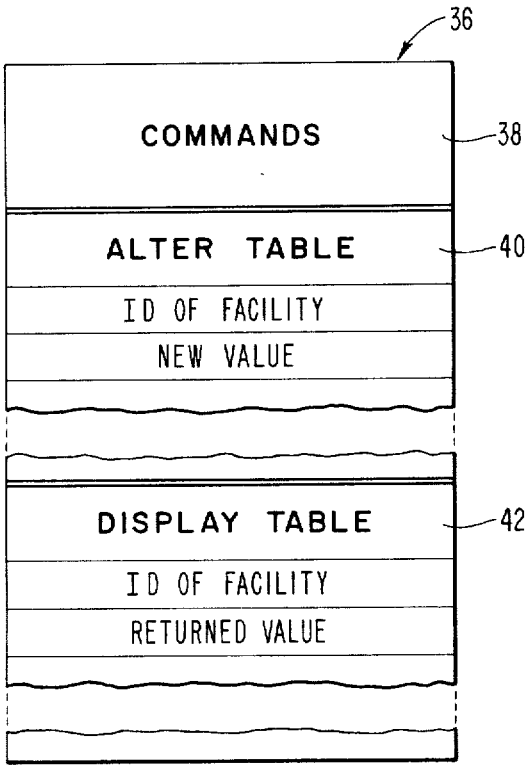

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED OCTOBER 7, 1975

939 O.G. 8

T939,006

MICROPROGRAM CONTROL SYSTEM

Alan A. Anderson, Wappingers Falls, and James W. Moore, Beacon, N.Y., assignors to International Business Machines Corporation, Armonk, N.Y.

Filed Aug. 19, 1974, Ser. No. 498,685

**Int. Cl. G065 *9/16***

U.S. Cl. 340—172.5

3 Sheets Drawing. 13 Pages Specification

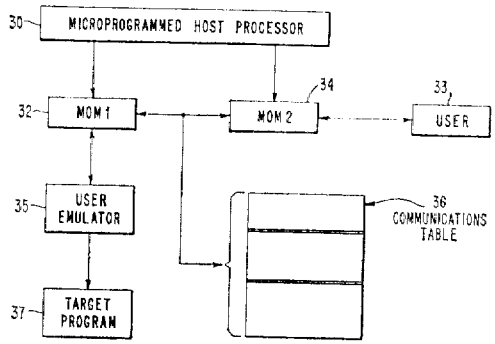

In the present invention a microprogramming system for controlling the execution of a microprogram emulator is provided. The microprogramming control system enables a stepping operation to be carried out on the execution of a user microprogram emulator for the purpose of observing its execution, detecting errors and modifying the emulator microprogram in accordance with user observations.

MAIN STORAGE

CONTROL STORAGE

COMMUNICATIONS TABLE